(12) United States Patent
Tung et al.

(10) Patent No.: US 9,953,338 B1
(45) Date of Patent: Apr. 24, 2018

(54) STRUCTURED CONTENT VIEWS OF WEB PAGE CONTENT

(75) Inventors: Julie Tung, Mountain View, CA (US);
Bahman Rabii, Berkeley, CA (US);
Mike Hochberg, Sunnyvale, CA (US);
Gregory J. Badros, Palo Alto, CA (US); Andres S. Perez-Bergquist, Mountain View, CA (US); Dan Ardelean, Mountain View, CA (US);
Jason C. Miller, San Francisco, CA (US)

(73) Assignee: Google Inc., Mountain View, CA (US)

( * ) Notice: Subject to any disclaimer, the term of this patent is extended or adjusted under 35 U.S.C. 154(b) by 2258 days.

(21) Appl. No.: 11/693,625

(22) Filed: Mar. 29, 2007

(51) Int. Cl.
*G06Q 30/02* (2012.01)

(52) U.S. Cl.
CPC .................... *G06Q 30/0241* (2013.01)

(58) Field of Classification Search
None
See application file for complete search history.

(56) References Cited

U.S. PATENT DOCUMENTS

| | | |
|---|---|---|
| 5,724,521 A | 3/1998 | Dedrick |
| 5,740,549 A | 4/1998 | Reilly et al. |
| 5,848,397 A | 12/1998 | Marsh et al. |
| 5,948,061 A | 9/1999 | Merriman |
| 6,026,368 A | 2/2000 | Brown et al. |
| 6,044,376 A | 3/2000 | Kurtzman, II |
| 6,078,914 A | 6/2000 | Redfern |
| 6,144,944 A | 11/2000 | Kurtzman, II et al. |
| 6,167,382 A | 12/2000 | Sparks et al. |
| 6,269,361 B1 | 7/2001 | Davis et al. |
| 6,401,075 B1 | 6/2002 | Mason et al. |
| 6,985,882 B1 | 1/2006 | Del Sesto |
| 7,136,875 B2 | 1/2006 | Anderson et al. |
| 7,039,599 B2 | 5/2006 | Merriman |
| 2005/0149395 A1* | 7/2005 | Henkin et al. ................ 705/14 |
| 2006/0287920 A1* | 12/2006 | Perkins et al. ............... 705/14 |

(Continued)

FOREIGN PATENT DOCUMENTS

WO     WO 97/21183     6/1997

OTHER PUBLICATIONS

U.S. Appl. No. 95/001,073, Reexamination of Stone et al., Sep. 30, 2004.

(Continued)

*Primary Examiner* — Daniel M Sorkowitz
(74) *Attorney, Agent, or Firm* — Fish & Richardson P.C.

(57) ABSTRACT

A method is provided. The method includes receiving a request for one or more ads, the request including a first identifier for a first content source, wherein a first set of content is available from the first content source, responsive to the request, determining whether a second set of content is available from a second content source, wherein the second set of content is a structured content version of the first set of content, converting the first identifier for the first content source to a second identifier for the second content source if the second set of content is available from the second content source, receiving the second set of content from the second content source using the second identifier, and selecting the one or more ads using at least some content from the second set of content from the second content source.

10 Claims, 4 Drawing Sheets

(56) References Cited

U.S. PATENT DOCUMENTS

| | | | |
|---|---|---|---|
| 2007/0083468 A1* | 4/2007 | Wetherell | G06F 17/3089 705/51 |
| 2007/0083673 A1* | 4/2007 | Lara et al. | 709/246 |
| 2007/0233565 A1* | 10/2007 | Herzog | G06Q 30/02 705/14.41 |
| 2007/0260627 A1* | 11/2007 | Knittel et al. | 707/101 |
| 2008/0010319 A1* | 1/2008 | Vonarburg et al. | 707/104.1 |

OTHER PUBLICATIONS

U.S. Appl. No. 95/001,061, Reexamination of Stone et al., Sep. 30, 2002.
U.S. Appl. No. 95/001,069, Reexamination of Stone et al., Jul. 11, 2002.
U.S. Appl. No. 95/001,068, Reexamination of Stone et al., Dec. 7, 2002.
AdForce, Inc., a Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www.Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www.Archive.org, archived on Jan. 30, 1998.
Zeff, R. et al., Advertising on the Internet, 2nd Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Pat. No. 7,240,025 B2, Control No. 95/001,073.
Request for Reexamination of U.S. Pat. No. 6,446,045 B1, Control No. 95/001,061.
Request for Reexamination of U.S. Pat. No. 7,249,059 B2, Control No. 95/001,069.
Request for Reexamination of U.S. Pat. No. 6,829,587 B2, Control No. 95/001,068.

* cited by examiner

STRUCTURED CONTENT VIEWS OF WEB PAGE CONTENT

BACKGROUND

This specification relates to serving a targeted ad request using Structured Content View (SCV) servers.

A publisher of a webpage can sell advertising space on the publisher's webpage. An advertiser may wish to advertise on a particular publisher webpage if, for example, the content of the webpage relates to products or services that the advertiser wishes to sell. A content ad provider (e.g., Google™) can be an intermediary between the publisher and the advertising by selecting relevant ads to be displayed on the publisher's webpage. The ads can be targeted to the specific content displayed on the publisher's webpage.

Generally, a typical webpage contains content that can include images, multimedia, and textual content. The textual content of a webpage can be used, for example, to extract keywords for serving a request for content ads. An advertiser can request ad placement on publisher webpages that contain certain keywords. If a webpage contains references to a keyword, a content ad provider can target ads for products or services related to that keyword.

Many webpages have substantial textual content that can be used for extracting information for targeting ads. However, some webpages provide only limited textual content making ad targeting more difficult. For example, the textual content of webpages on online social networks (e.g., MySpace®) can be fragmented and brief. Additionally, information which would be relevant for ad targeting may not be linked to a webpage, preventing this information from being gathered to supplement the limited textual content of the webpage. In these circumstances, the targeted ads returned may not be very relevant to the content on the webpage.

SUMMARY

A system, methods, and computer program products for serving a targeted ad request using one or more structured content view servers are provided. In general, in one aspect, a method and a computer program product, respectively, are provided. The method and computer program product include receiving a request for one or more ads, the request including a first identifier for a first content source, wherein a first set of content is available from the first content source, responsive to the request, determining whether a second set of content is available from a second content source, wherein the second set of content is a structured content version of the first set of content, converting the first identifier for the first content source to a second identifier for the second content source if the second set of content is available from the second content source, receiving the second set of content from the second content source using the second identifier, and selecting the one or more ads using at least some content from the second set of content from the second content source.

In general, in another aspect, a method and a computer program product, respectively, are provided. The method and computer program product include receiving a request for one or more ads, the request including a first identifier for a first content source, responsive to the request, determining whether the one or more ads should be selected based on a first set of content from the first content source or a second set of content from a second content source, converting the first identifier for the first content source to a second identifier for the second content source if the one or more ads should be selected based on the second set of content from the second content source, receiving the second set of content from the second content source using the second identifier, and selecting the one or more ads based on the second set of content from the second content source.

In general, in one aspect, a method and a computer program product, respectively, are provided. The method and computer program product include receiving a first request for content, the first request for content using a first identifier, transmitting a first response including a first set of content, receiving a second request for content, the second request for content using a second identifier, and transmitting a second response including a second set of content, wherein the second set of content is a structured content version of the first set of content.

In general, in another aspect, a method and a computer program product, respectively, are provided. The method and computer program product include receiving at a first webserver a first request from a user device, the first request being a request for content from a webpage, the webpage hosted on the first webserver, transmitting a first response from the first webserver to the user device, the first response including webpage content and an instruction to initiate a second request, the second request being a request for ad content, transmitting the second request from the user device to a content ad provider, the second request including a first Uniform Resource Locator for the webpage, converting the first Uniform Resource Locator for the webpage to a second Uniform Resource Locator for a second webserver, the second webserver hosting a structured content version of the webpage, transmitting a third request from the content ad provider to the second webserver, the third request being a request for content from the structured content version of the webpage, the third request including the converted second Uniform Resource Locator for the second webserver, transmitting a second response from the second webserver to the content ad provider, the second response including content from the structured content version of the webpage, and transmitting a third response from the content ad provider to the user device, the third response including targeted ads.

In general, in one aspect, a system is provided. The system includes a user device, a content ad provider, a first webserver, and a second webserver. The user device is operable to transmit a first request for content from a webpage and to transmit a second request for ad content, wherein the second request includes a first Uniform Resource Locator for the webpage. The content ad provider is operable to receive the second request for ad content, to convert the first Uniform Resource Locator for the webpage to a second Uniform Resource Locator, to transmit a third request for content from a structured content version of the webpage, and to transmit targeted ads to the user device, wherein the third request includes the converted second Uniform Resource Locator. The first webserver is operable to receive the first request for content from the webpage and to transmit to the user device a first response including webpage content and an instruction to initiate a request for ad content, wherein the first webserver hosts the webpage. The second webserver is operable to receive the third request for content from the structured content version of the webpage and to transmit to the content ad provider a second response including content from the structured content version of the webpage, wherein the second webserver hosts the structured content version of the webpage.

Particular embodiments of the subject matter described in this specification can be implemented to realize one or more of the following advantages. A structured content view of a normal webpage with limited textual content allows a content ad provider to better serve a content ad request with relevant ads for the webpage. Knowing the predefined schema of the structured content view, a content ad provider can extract ad targeting information from the structured content view of the webpage which includes annotations of the webpage's textual content and references to additional content sources. Additionally, textual content that is stock language or otherwise generally not useful for ad targeting can be identified or omitted in the structured content view of the webpage.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
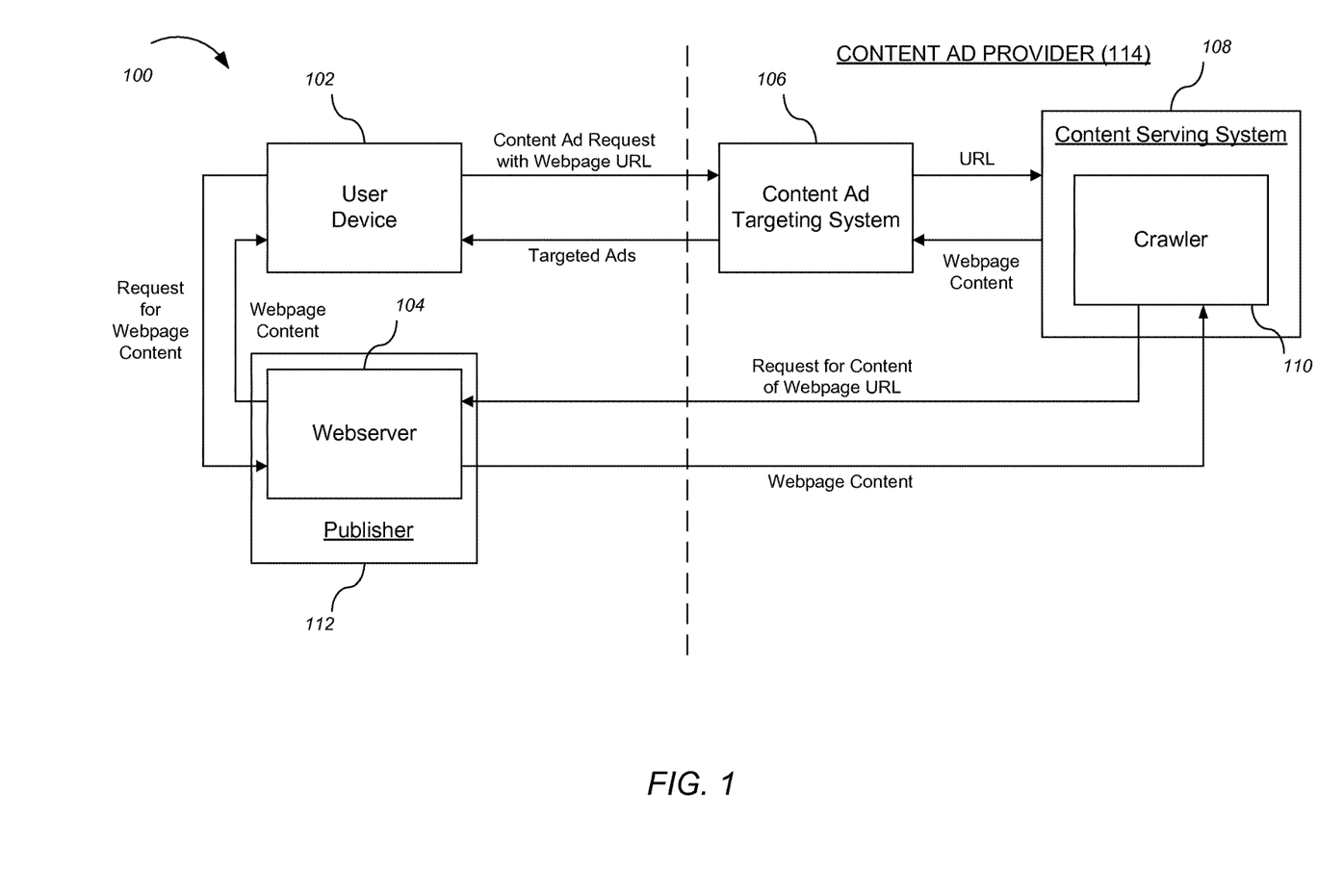
FIG. 1 is an example block diagram of a system for serving a targeted ad request.

FIG. 1 is an example block diagram of a system 100 for serving a targeted ad request. The system 100 includes a user device 102, a webserver 104, a content ad targeting system 106, a content serving system 108, and a crawler 110.

A user of a device 102 initiates a request for content from a webpage. The user device 102 can be any device capable of receiving content from a webpage, such as a personal computer, a mobile device, a cell phone, a personal digital assistant (PDA), a media player, a game console, a Global Positioning System (GPS) receiver, or a television system, etc. The content request can be initiated through, for example, a user interface of a web browser running on the user device 102. The content request is sent to the webserver 104 which hosts the requested webpage. In some implementations, the webserver 104 is maintained or controlled by a publisher 112.

The webserver 104 responds to the content request by sending the requested webpage content to the user device 102. In some implementations, the webpage content sent to the user device 102 is in the form of a HyperText Markup Language (HTML) document. If the publisher 112 of the webpage is using a content ad provider 114, e.g., Google™, to target ads for the webpage, the response sent from the webserver 104 to the user device 102 can also include an instruction to initiate a request for ad content. In some implementations, the webserver 104 sends the request for ad content to the content ad provider 114 and sends the received ad content to the user device 102 with the requested webpage content.

In some implementations, the webpage can have a layout that includes space for the webpage content (e.g., textual content, images, or multimedia) and space for one or more targeted ads. In the space reserved for targeted ads, the publisher 112 can include embedded information, such as links, meta-information, or machine-executable instructions to initiate the ad request.

When the user device 102 receives the webpage content from the webserver 104, the user device 102 renders the webpage content for display. The instruction to initiate a request for ad content is executed by transmitting the ad request from the user device 102 to the content ad provider 114. The request for ad content includes the Uniform Resource Locator (URL) for the webpage. In other implementations, a different webpage identifier is included in the request for ad content. For example, the webpage identifier can be a Uniform Resource Identifier (URI) or an alias address (e.g., a domain name).

In the implementation of FIG. 1, the content ad provider 114 includes a content ad targeting system 106, a content serving system 108, and a crawler 110. In some implementations, the crawler 110 is part of the content serving system 108. The content ad targeting system 106 matches advertisements to the content of a webpage. The advertisements can, for example, be in the form of graphical ads, such as banner ads, text-only ads, image ads, audio ads, video ads, ads combining one of more of any of such components, etc. The advertisements can also include embedded information, such as links, meta-information, or machine-executable instructions.

The content serving system 108 provides the webpage content using the URL of the webpage included in the ad request. If the content serving system 108 has a locally cached response to the ad request, the content serving system 108 can serve the content ad request directly without initiating a crawl of the webpage.

If a crawl of the webpage is necessary because a "fresh" locally cached response to the ad request is unavailable, the crawler 110 sends a content request with the webpage URL to the webserver 104 hosting the webpage. When the webserver 104 receives the request, the webserver 104 transmits a response including the webpage content to the crawler 110. In some implementations, the webserver 104 transmits the webpage content as an HTML document. The crawler 110 forwards the webpage content to the content ad targeting system 106.

In some implementations, the content ad targeting system 106 matches ads to the webpage content by extracting one or more keywords from the textual content of the webpage. These keywords can be matched with advertisements for related products or services. For example, for a webpage displaying an article about running marathons, the content ad targeting system 106 might extract the frequently occurring keywords "running" and "marathon" from the textual content of the webpage. Targeted ads for this webpage might include ads for running shoes, sports drinks, and athletic clubs.

The content ad targeting system 106 selects targeted ads for the webpage based on the content of the webpage. In some implementations, the content ad targeting system 106 also selects content related to the targeted ads to accompany the targeted ads. In the marathon example, a video clip of a marathon runner crossing the finish line might be selected by the content ad targeting system 106 to accompany an ad for running shoes.

The content ad targeting system 106 transmits a response to the user device 102 including the targeted ads and, in some implementations, related content. The user device 102 completes the rendering of the webpage by incorporating the targeted ads into the advertising space reserved in the webpage layout. In some implementations, the targeted ads are embedded in the webpage content. The user device 102 displays the combined webpage content with the targeted ads.

Generally, a typical webpage contains sufficient amounts of textual content to allow a content ad provider 114 to target relevant ads for the webpage. However, some webpages contain little or no textual content. For example, a member user's webpage on an online social network might display an album of digital photos. If the photos do not have associated titles and comments, there may be very little textual content displayed on the webpage. An attempt to target ads for a webpage of such limited textual content might result in ads of little or no relevance to the webpage content. Additionally, it can be difficult to extract the relevant textual content that is present if it is a small part of the webpage and is not annotated.

Figure 2:
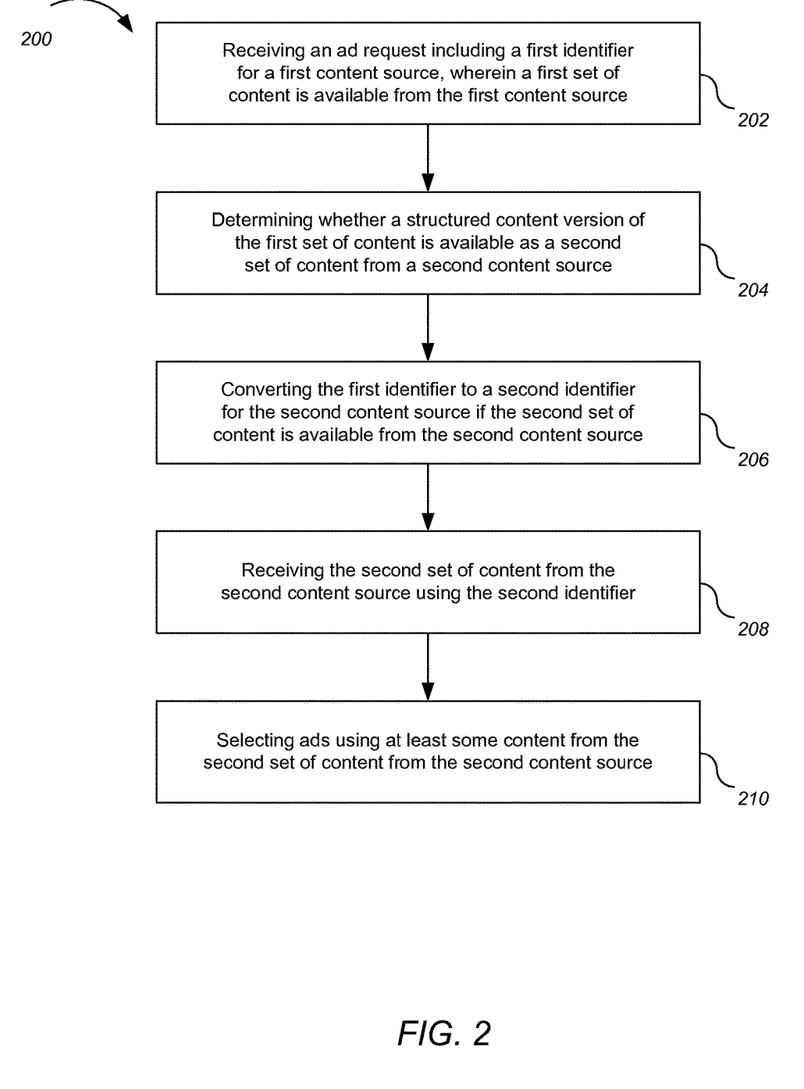
FIG. 2 illustrates an example process for serving an ad request.

FIG. 2 illustrates an example process 200 for serving an ad request. For convenience, the process 200 will be described with reference to a system that performs the process 200. The process 200 can, for example, be implemented by a content ad provider.

Step 202 receives an ad request, where the ad request includes a first identifier for a first content source, where a first set of content is available from the first content source. For example, the ad request can be sent from a user device 102 to a content ad provider. In some implementations, the first identifier is a URL, a URI, or an alias address (e.g., a domain name). The ad request can be initiated in accordance with instructions included in content from the first content source sent to the user device 102.

In response to the ad request, step 204 determines whether a second set of content is available from a second content source, where the second set of content is a structured content version of the first set of content. A structured content version of content will be described in more detail below.

In some implementations, the process 200 determines whether one or more ads should be selected based on a first set of content available from the first content source or a second set of content available from a second content source, where the first set of content differs from the second set of content. Whether the ads should be selected based on the first set of content or the second set of content can depend, for example, on which of the two sets of content contain more text from which information can be extracted for ad targeting.

If it is determined that a structured content version of the first set of content is not available as a second set of content from a second content source, a request for the first set of content is sent, and one or more ads are selected based on the content received. If it is determined that a structured content version of the first set of content is available as a second set of content from a second content source, step 206 converts the first identifier for the first content source to a second identifier for the second content source.

In some implementations, the determination that a structured content version of the first set of content is available is made by evaluating the first identifier for the first content source. For example, if a publisher of the first content source is using a content ad provider to target ads for webpages hosted on the first content source, the publisher may agree to provide structured content versions of the publisher's webpages for ad targeting. The publisher can host on a second content source a structured content version of a webpage hosted on the first content source, where the structured content version is accessible using a second identifier for the second content source. In this example, when the content ad provider evaluates the first identifier for the first content source, the content ad provider recognizes that the first identifier is associated with content which is also available in a structured content version accessible using the second identifier for the second content source. The first identifier itself can indicate that a structured content version is available. That is, the content ad provider only needs the first identifier to recognize that the structured content version is available.

In some implementations, a mapping table can be used to correlate the first identifiers with the second identifiers. Alternatively, algorithms or rules can be used to correlate the first identifiers with the second identifiers.

In some implementations, once the content ad provider recognizes that a structured content version of the first set of content is available from the second content source, the content ad provider can access the structured content version without waiting to receive a content request. For example, the content ad provider can perform regularly scheduled crawls of the structured content version to capture any changes in the content.

In some implementations, the second identifier is a URL, a URI, or an alias address. In some implementations, only a portion of the first identifier is converted. For example, if a publisher maintains both the first content source and the second content source, the first identifier can have a first portion that is identical to a portion of the second identifier and a second portion that differs from a portion of the second identifier. In this example, only the portion that differs needs to be converted to match the second identifier.

In some implementations, the first identifier includes an unencrypted identifier for a user, but the second identifier does not include the unencrypted identifier of the user. For example, the unencrypted user identifier and other personally identifiable information can be omitted from the second identifier for security reasons. In some implementations, the second identifier includes one or more of an encrypted identifier of a user or an encrypted identifier of an owner of the first set of content from the first content source. These encrypted identifiers can be added to the second identifier for the second content source to provide references to additional content sources.

In some implementations, the first content source and the second content source are the same content source. The common content source is configured to transmit the second set of content when it receives a request for content including the second identifier. For example, a publisher can maintain a webserver 104 that provides both the first set of content and the second set of content. Upon receiving a request for content which includes the second identifier, the publisher can transmit a structured content version of the first set of content.

Step 208 receives the second set of content from the second content source using the second identifier. Generally, the second set of content is a structured content version of the first set of content from the first content source. In some implementations, the second set of content is formatted according to a predefined schema. The predefined schema can be implemented as, for example, an Extensible Markup Language (XML) document.

In some implementations, the second set of content can include one or more annotations that are not included in the first set of content from the first content source. For example, these annotations can be used to classify the types of textual content on a webpage, providing the context for content on the webpage. For example, a member user's webpage on an online social network might display images and audio clips.

Textual content associated with these images and audio clips can be annotated, for example, to indicate that the text represents photo captions or the member user's music interests, respectively.

In some implementations, the second set of content can include one or more references (e.g., links to) information from content sources other than the first content source. The references to additional content sources provide additional textual content to assist in ad targeting.

Step 210 selects one or more ads using at least some content from the second set of content from the second content source. In some implementations, ads are selected using both the second set of content and content from another source, e.g., the first set of content.

The process 200 can select one or more ads based on the second set of content from the second content source. For example, if the second set of content includes annotations, ad targeting information including the annotations can be extracted to select related ads. In some implementations, content is gathered from additional content sources referenced in the second set of content. Information can be extracted from this additional content to improve ad targeting, especially when the first set of content from the first content source contains little textual content.

Figure 3:
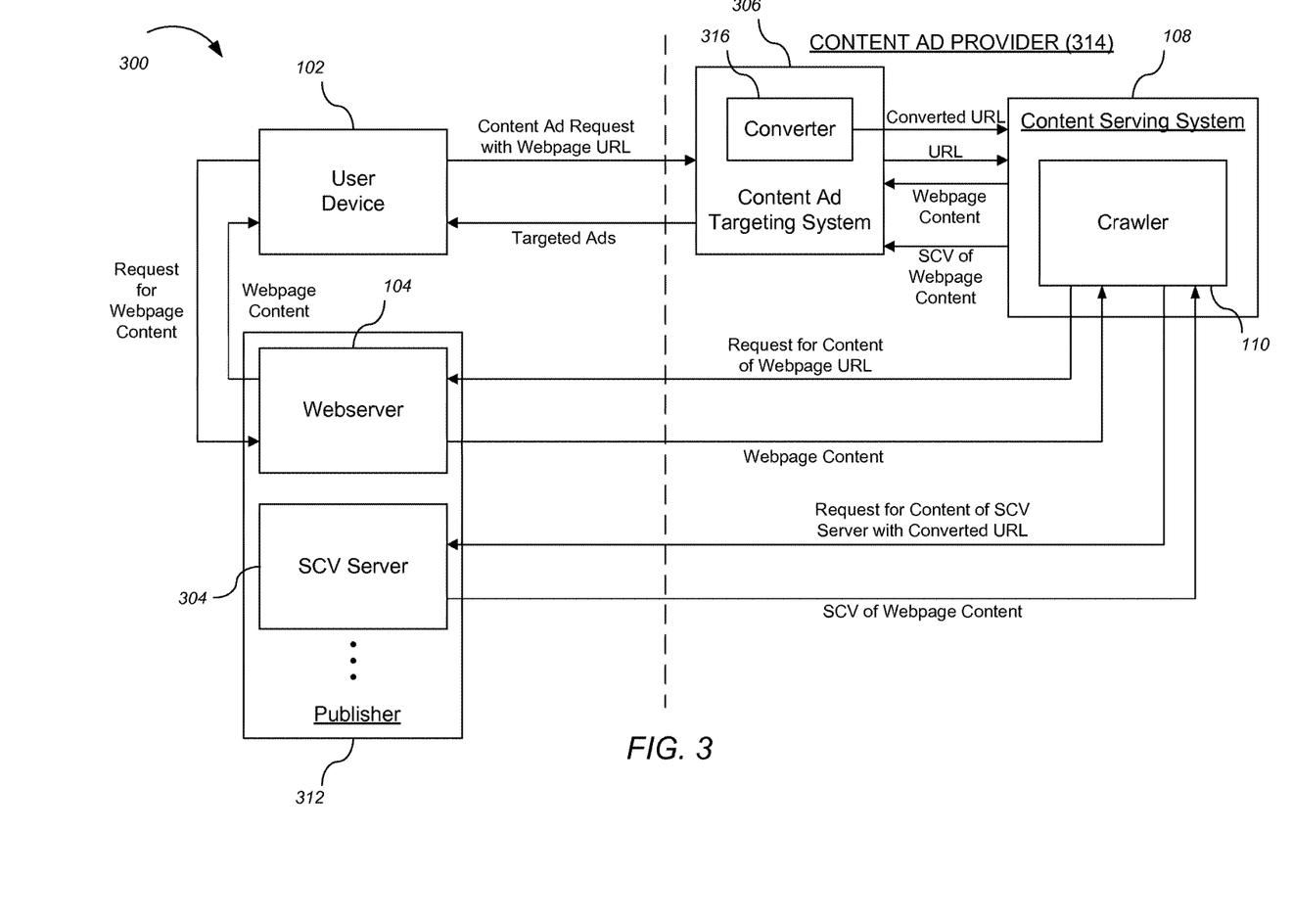
FIG. 3 is an example block diagram illustrating serving a targeted ad request using one or more structured content view (SCV) servers.
Figure 4:
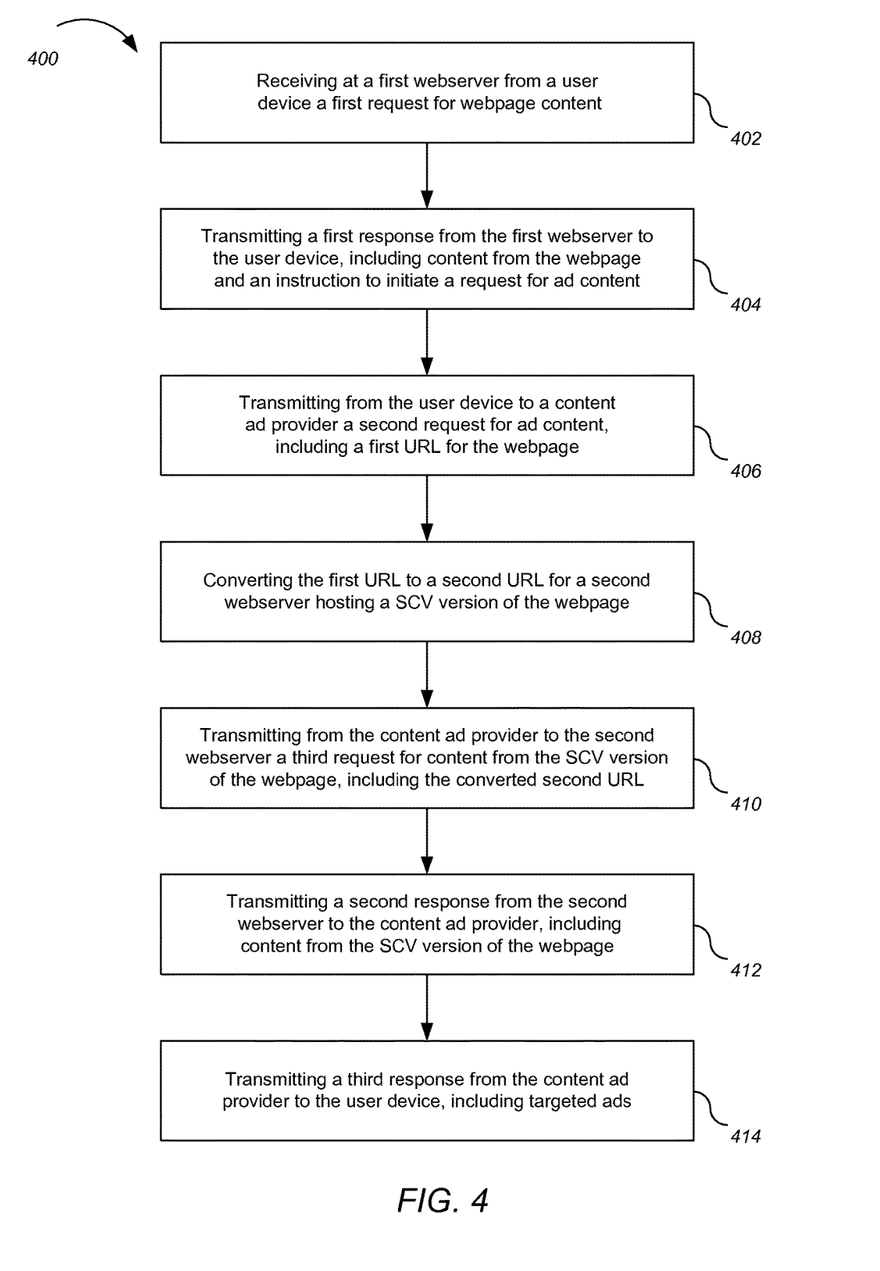
FIG. 4 illustrates an example process for serving a targeted ad request using one or more SCV servers.

FIG. 4 illustrates an example process 400 for serving a targeted ad request using one or more SCV servers 304. For convenience, the process will be described with reference to a system 300, illustrated in FIG. 3, which performs the process 400. FIG. 3 is an example block diagram of the system 300 illustrating serving a targeted ad request using one or more SCV servers 304. The system 300 includes a user device 102, a webserver 104, an SCV server 304, a content ad targeting system 306, a content serving system 108, and a crawler 110.

A user of a device 102 initiates a first request for webpage content through, for example, a user interface of a web browser running on the user device 102. The content request is sent to the webserver 104 hosting the requested webpage.

The webserver 104 receives from the user device 102 the first request for content from the webpage (402). In some implementations, the webserver 104 is maintained or controlled by a publisher 312 of, for example, an online social network such as MySpace®. Other social networks can, for example, include school alumni websites, an internal company web site, dating networks, etc.

The webserver 104 transmits to the user device 102 a first response, where the first response includes the requested webpage content and an instruction to initiate a second request for ad content (404) from the content ad provider 314. In some implementations, the webpage is formatted as an HTML document. In some implementations, the webserver 104 sends the second request for ad content to the content ad provider 314, waits for the ad content from the content ad provider 314, and sends the webpage content with the received ad content to the user device 102.

After the user device 102 receives the response, the user device 102 renders the webpage content for display and transmits to the content ad provider 314 the second request for ad content which includes a first URL for the webpage (406). In some implementations, a different identifier (e.g., a URI or an alias address) is used for the webpage.

In the implementation illustrated in FIG. 3, the content ad provider 314 includes a content ad targeting system 306, a content serving system 108, and a crawler 110. In some implementations, the crawler 110 is part of the content serving system 108. In other implementations, the content serving system 108 and the crawler 110 are distinct components, and data are transmitted between the two components.

The content ad targeting system 306 receives the content ad request and the webpage URL from the user device 102. Because the webpage publisher 312 and the content ad provider 314 have already arranged for the content ad provider 314 to target ads for the publisher's webpage, the content ad provider 314 can be configured to recognize a content ad request for a webpage that has a parallel structured content view (SCV). Instead of passing the webpage URL to the content serving system 108, the content ad targeting system 306 passes a rewritten version of the URL. That is, the content ad provider 314 converts using converter 316 the first URL for the requested webpage to a second URL for a second webserver (i.e., the SCV server 304) (408). The SCV server 304 hosts a structured content version of the same content available on the requested webpage.

In some implementations, both the webserver 104 and the SCV server 304 are maintained by the same publisher 312. In some implementations, the publisher 312 maintains multiple SCV servers 304. In some implementations, the webserver 104 and the SCV server 304 are maintained by two different publishers.

In some implementations, the URL is rewritten using regular expressions. In some implementations, personally identifiable information (e.g., the unencrypted ID of the requesting user) contained in the webpage URL is removed. Additional parameters such as, for example, the encrypted webpage owner ID or the encrypted user ID can be added to the converted URL.

The content ad targeting system 306 transmits the converted URL to the content serving system 108. The content serving system 108 can be configured to accept the converted URL as if it was the regular URL of the requested webpage. Similarly, the crawler 110 can also be configured to accept the converted URL in place of the regular URL of the webpage. If the content serving system 108 has a locally cached response to the content ad request, the content serving system 108 can serve the ad request directly without initiating a crawl of the structured content version of the webpage. If a crawl of the SCV of the webpage is necessary, the crawler 110 sends a content request with the converted URL to the SCV server 304 hosting the SCV of the webpage.

The content ad provider 314 transmits to the second webserver (i.e., the SCV server 304) a third request for content from the structured content version of the webpage (410). The third request includes the converted second URL for the second webserver.

The SCV server 304 is configured by the webpage publisher 312 to provide a structured version of the content displayed on the normal webpage. Generally, the webserver 104 and the SCV server 304 are both managed or controlled by the publisher 312. In some implementations, the webserver 104 and the SCV server 304 access the same repository of information. For example, the webserver 104 can access a database for the webpage content, and the SCV server 304 can access the same database but format the webpage content differently. In particular, in some implementations, the SCV server 304 can format the structured content version of the webpage in accordance with a schema. The schema can be predefined and known to both the publisher 312 and the content ad provider 314. In some implementations, the SCV of the webpage can be formatted as an XML document.

The SCV of the webpage can include annotations for the textual content of the webpage. These annotations can be used to classify the types of textual content on the webpage providing the context for the webpage. The SCV of the webpage can include annotations for all of the textual content or some subset of the textual content.

Additionally, the SCV of the webpage can reference (e.g., include links to) information from content sources other than the requested webpage. That is, the SCV of the webpage can include information that does not actually appear on the typical HTML version of the webpage provided by the webserver 104. For example, the SCV of the webpage can provide a blog ID unavailable on the regular version of the webpage. The references to additional content sources provide additional textual content to assist in ad targeting.

When the SCV server 304 receives the third content request, the SCV server 304 transmits a second response to the content ad provider 314, where the second response includes content from the SCV of the webpage (412). The crawler 110 of the content ad provider 314 forwards the SCV of the webpage to the content ad targeting system 306.

The content ad targeting system 306 selects targeted ads for the webpage based on the SCV of the webpage content. A webpage with limited textual content in its HTML version can have significantly more textual content in its SCV version. The additional textual content can be provided by the annotations and the references to additional content sources. For example, if the SCV of the webpage content included a blog ID, the content ad targeting system 306 can gather additional textual content from the blog identified by the ID if the requested webpage contains insufficient textual content to target relevant ads. That is, the additional content sources referenced in the SCV of the webpage provide information which can be extracted to supplement limited textual content of the requested webpage, if necessary. If the SCV of the webpage is structured in accordance with a schema predefined and known to the content ad targeting system 306, the content ad targeting system 306 can parse the SCV version of the webpage and use the known classification of the textual content to better target relevant ads for the requested webpage.

The content ad targeting system 306 of the content ad provider 314 transmits a third response to the ad request to the user device 102 including the selected targeted ads (414). The user device 102 incorporates the targeted ads into the reserved advertising space of the webpage layout and displays the combined webpage content with the targeted ads. In some implementations, the targeted ads are embedded in the webpage content.

In some implementations, the webserver 104 and the SCV server 304 are the same server. In these implementations, the common server can be configured to transmit to the crawler 110 the SCV of the webpage content when the common server receives a content request which includes a converted URL.

In some implementations, the structured content version of a webpage is available as an XML feed. That is, instead of the SCV server 304 responding to each content request with a structured content document of the webpage content, the SCV server 304 provides a base document for the initial content request for a SCV of a particular webpage. Following content requests for the SCV of the particular webpage can be served by transmitting only the changes relative to the base document or the changes relative to the most recently transmitted changes. For example, a publisher's webpages can be grouped into page types where each page type has a separate XML feed.

In some implementations, the content ad provider 314 can use intelligent document parsers to extract targeting information from the normal webpage content. Typically, this content is formatted as an HTML document. The intelligent document parser knows the type of HTML document to expect and can extract information based on the expected format for the document type. For example, the parser can search for the phrase "gender" and extract the text immediately following it, inferring that the extracted text contains gender information. If the content ad provider 314 uses an intelligent document parser, the provider does not need a structured content version of the webpage content.

In some implementations, the publisher 312 annotates the normal webpage content instead of configuring one or more SCV servers 304 to host structured content versions of the webpage content. These annotations provide additional textual content for information extraction for ad targeting.

In some implementations, the content ad targeting system 306 selects ads using at least some content from the SCV of the webpage content. That is, the content ad targeting system 306 can select ads using only some portion of the content from the SCV version. In other implementations, the content ad targeting system 306 selects ads using content from both the SCV version and from another source.

In some implementations, the content ad targeting system 306 requests content using both the original URL (i.e., the first identifier) and the converted URL (i.e., the second identifier). For example, the crawler 110 can return the normal webpage content and the SCV of the webpage content. The content ad targeting system 306 can evaluate both versions and can select targeted ads based on only the SCV of the webpage content or both versions of the webpage content.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, which is generated to encode information for transmission to suitable receiver apparatus for execution by a computer. The computer-readable medium can be a machine-readable storage device, a machine-readable storage substrate, a memory device, a composition of matter affecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. The methods and systems described can be used to target ads for a variety of webpages and not just online social network webpages.

What is claimed is:

1. A method comprising: at a computing system having one or more computers:
    receiving a request for one or more ads, the request including a first identifier for a first set of content available from a first content source hosted by a publisher, the first set of content formatted as a HTML document, the first identifier including a URL or URI network identifier;
    examining, by the computing system, the first identifier, and in response, determining that the first set of content available from the first content source is not annotated using a particular predefined schema configured to be processed by the computing system, the particular predefined schema including a XML format;

determining, by the computing system, that the first identifier indicates that a structured content version of the first set of content is available from a second content source hosted by the publisher, the structured content version of the first set of content annotated using the particular predefined schema configured to be processed by the computing system, wherein the structured content version of the first set of content including one or more annotations to the first set of content generated by the publisher that are not included in the first set of content, and are formatted according to the particular predefined schema;

identifying a page type of the first set of content;

identifying, by the computing system, a particular XML feed of multiple XML feeds that is based on the page type of the first set of content;

converting, by the computing system, the first identifier for the first content source in the request to a second identifier for the second content source that includes the structured content version of the first set of content, the second identifier including a URL or URI network identifier;

obtaining, using the second identifier, the structured content version of the first set of content from the second content source hosted by the publisher, the obtaining including obtaining one or more updates to the particular XML feed relative to a base XML document of the particular XML feed, the particular XML feed including the structured content version of the first set of content;

extracting, from the structured content version of the first set of content that was obtained from the second content source by the computing system, the one or more annotations to the first set of content that are not included in the first set of content by parsing the structured content version of the first set of content in accordance with the particular schema;

selecting, by the computing system and to a client device that submitted the request, the one or more ads to be served with the first set of content based on the one or more annotations to the first set of content that are not included in the first set of content; and outputting, by the computing system, the selected one or more ads to the client device for presentation with the first set of content.

2. The method of claim 1, wherein converting the first identifier for the first content source comprises converting a portion of the first identifier for the first content source.

3. The method of claim 1, wherein:
the first identifier for the first content source includes an unencrypted identifier for a user; and
the second identifier for the second content source does not include the unencrypted identifier of the user.

4. The method of claim 1, wherein:
the second identifier for the second content source includes one or more of an encrypted identifier of a user or an encrypted identifier of an owner of the first set of content from the first content source.

5. The method of claim 1, wherein selecting the one or more ads to be served with the first set of content based on the one or more annotations to the first set of content and that are not included in the first set of content further comprises:
identifying one or more additional content sources by parsing the structured content version in accordance with the particular predefined schema, the one or more additional content sources referenced in the structured content version of the first set of content, the one or more additional content sources not referenced in the first set of content from the first content source; and
extracting information from the one or more additional content sources.

6. The method of claim 1, wherein:
the first content source and the second content source are the same content source; and
the first content source is configured to transmit a structured content version of the first set of content when it receives a request for content, the request for content including the second identifier.

7. The method of claim 1, wherein the first set of content includes content from a webpage of an online social network.

8. A method comprising: at a computing system having one or more computer:
receiving at a first webserver a first request from a user device, the first request being a request for content from a webpage, the webpage hosted on the first webserver;
transmitting a first response from the first webserver to the user device, the first response including webpage content and an instruction to initiate a second request, the second request being a request for ad content;
transmitting the second request from the user device to a content ad provider, the second request including a first Uniform Resource Locator for the webpage, the webpage formatted as a HTML document;
examining, by the computing system, the first Uniform Resource Locator, and in response, determining that the webpage is not annotated using a particular predefined schema configured to be processed by the first webserver, the particular predefined schema including a XML format;
determining that the first Uniform Resource Locator indicates that a structured content version of the webpage is available from a second webserver, the structured content version of the webpage annotated using the particular predefined schema configured to be processed by the first webserver, wherein the structured content version of the webpage includes one or more annotations to the webpage, generated by a publisher of the webpage, that are not included in the webpage, and are formatted according to the particular predefined schema;
identifying a page type of the webpage;
identifying, by the computing system, a particular XML feed of multiple XML feeds that is based on the page type of the webpage;
converting, by the computing system, the first Uniform Resource Locator for the webpage to a second Uniform Resource Locator for a second webserver that includes the structured content version of the webpage;
transmitting a third request from the content ad provider to the second webserver, the third request being a request for the one or more annotations from the structured content version of the webpage, the request further including a request for one or more updates to the particular XML feed relative to a base XML document of the particular XML feed, the particular XML feed including the structured content version of the webpage, the third request including the converted second Uniform Resource Locator for the second webserver;
transmitting a second response from the second webserver to the content ad provider, the second response including the one or more annotations from the structured content version of the webpage, wherein the one or more annotations from the structured content version of the webpage is extracted from the structured content version of the webpage by parsing the structured content version of the webpage in accordance with the particular predefined schema; and transmitting, using one or more computers, a third response from the content ad provider to the user device, the third response including targeted ads, the targeted ads being selected based at least in part on the one or more annotations to the webpage that are not included in the webpage.

9. A computer program product, tangibly stored on a non-transitory machine-readable medium, comprising instructions operable to cause a programmable processor to:

receive a request for one or more ads, the request including a first identifier for a first set of content available from a first content source hosted by a publisher, the first set of content formatted as a HTML document, the first identifier including a URL or URI network identifier;

examine the first identifier, and in response, determine that the first set of content available from the first content source is not annotated using a particular predefined schema configured to be processed by the computing system, the particular predefined schema including a XML format;

determine that the first identifier indicates that a structured content version of the first set of content is available from a second content source hosted by the publisher, the structured content version of the first set of content annotated using the particular predefined schema configured to be processed by the computing system, wherein the structured content version of the first set of content including one or more annotations to the first set of content generated by the publisher that are not included in the first set of content, and are formatted according to the particular predefined schema;

identify a page type of the first set of content;

identify a particular XML feed of multiple XML feeds that is based on the page type of the first set of content;

convert the first identifier for the first content source in the request to a second identifier for the second content source that includes the structured content version of the first set of content, the second identifier including a URL or URI network identifier;

obtain, using the second identifier, the structured content version of the first set of content from the second content source hosted by the publisher, the obtaining including obtaining one or more updates to the particular XML, feed relative to a base XML, document of the particular XML feed, the particular XML feed including the structured content version of the first set of content;

extract, from the structured content version of the first set of content that was obtained from the second content source, the one or more annotations to the first set of content that are not included in the first set of content by parsing the structured content version of the first set of content in accordance with the particular schema; and select the one or more ads to be served with the first set of content based on the one or more annotations to the first set of content that are not included in the first set of content.

10. A computer program product, tangibly stored on a machine-readable medium, comprising instructions operable to cause a programmable processor to:

receive at a first webserver a first request from a user device, the first request being a request for content from a webpage, the webpage hosted on the first webserver;

transmit a first response from the first webserver to the user device, the first response including webpage content and an instruction to initiate a second request, the second request being a request for ad content;

transmit the second request from the user device to a content ad provider, the second request including a first Uniform Resource Locator for the webpage, the webpage formatted as a HTML document;

examining the first Uniform Resource Locator, and in response, determining that the webpage is not annotated using a particular predefined schema configured to be processed by the first webserver, the particular predefined schema including a XML format;

determining that the first Uniform Resource Locator indicates that a structured content version of the webpage is available from a second webserver, the structured content version of the webpage annotated using the particular predefined schema configured to be processed by the first webserver, wherein the structured content version of the webpage includes one or more annotations to the webpage, generated by a publisher of the webpage, that are not included in the webpage, and are formatted according to the particular predefined schema;

identifying a page type of the webpage;

identifying particular XML feed of multiple XML feeds that is based on the page type of the webpage;

convert the first Uniform Resource Locator for the webpage to a second Uniform Resource Locator for a second web server that includes the structured content version of the webpage;

transmit a third request from the content ad provider to the second webserver, the third request being a request for the one or more annotations from the structured content version of the webpage, the request further including a request for one or more updates to the particular XML feed relative to a base XML document of the particular XML feed, the particular XML feed including the structured content version of the webpage, the third request including the converted second Uniform Resource Locator for the second webserver;

transmit a second response from the second webserver to the content ad provider, the second response including the one or more annotations from the structured content version of the webpage, wherein the one or more annotations from the structured content version of the web page is extracted from the structured content version of the webpage by parsing the structured content version of the webpage in accordance with the particular predefined schema; and transmit, using one or more computers, a third response from the content ad provider to the user device, the third response including targeted ads, the targeted ads being selected based at least in part on the one or more annotations to the webpage that are not included in the webpage.

* * * * *